(No Model.)

T. J. HOUGHTON.
HARNESS SADDLE.

No. 513,396.

Patented Jan. 23, 1894.

Witnesses:
S. Grant Johnston
J. C. Russell

Inventor:
Thomas J. Houghton
By
Daniel H. Herr.
Attorney.

UNITED STATES PATENT OFFICE.

THOMAS J. HOUGHTON, OF LANCASTER, PENNSYLVANIA.

HARNESS-SADDLE.

SPECIFICATION forming part of Letters Patent No. 513,396, dated January 23, 1894.

Application filed July 8, 1893. Serial No. 479,958. (No model.)

*To all whom it may concern:*

Be it known that I, THOMAS J. HOUGHTON, a citizen of the United States, residing at Lancaster, in the county of Lancaster and State of Pennsylvania, have invented certain new and useful Improvements in Harness-Saddle Trees; and I do hereby declare the following to be a full, clear, and exact description of the invention, such as will enable others skilled in the art to which it appertains to make and use the same.

This invention relates to improvements in a harness saddle tree consisting of a base, a seat, a pivoted guard arm, and a spring to hold said arm.

The object of the invention is to securely hold the rear or folded end of a check- or bridle-rein in place when a horse is reined up, as well as to prevent the saddle tree from making the back of said horse sore.

The elements of the invention will fully appear in the following description and will be clearly set forth in the claim.

The purposes of the invention are attained by the mechanism and devices illustrated in the accompanying drawings, in which similar letters and figures of reference designate like parts throughout the several views and in which:—

Figure 1:
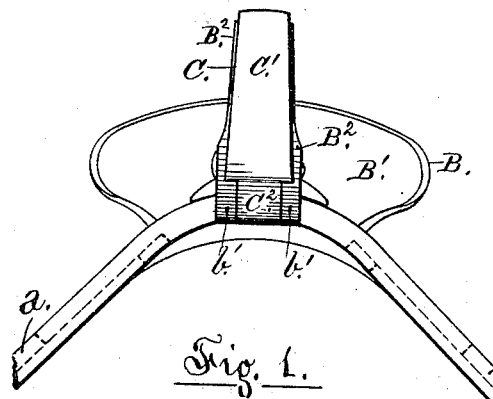
Figure 2:
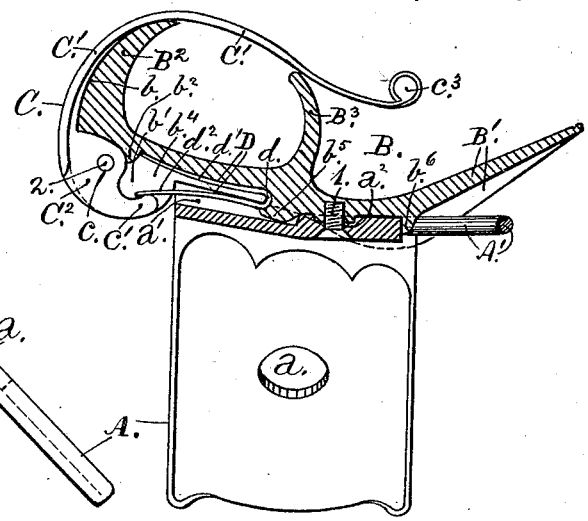

Figures 1 and 2 are, respectively, a front elevation, and a longitudinal vertical section of a saddle tree embodying the elements of the invention, said tree being detached from its saddle; and Figs. 3, 4, 5, and 6 are views showing details in the construction thereof.

Figure 3:
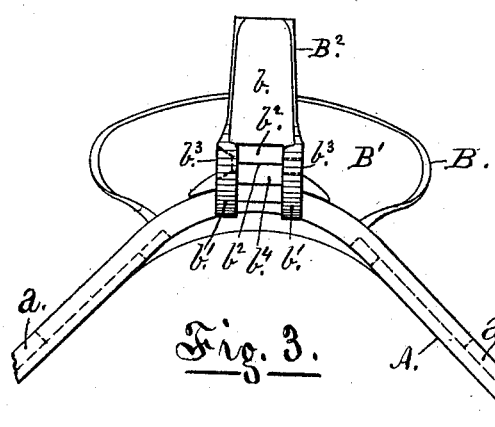

In the drawings A designates the base; B, the seat; C, the retaining clasp or guard; and D, the holding spring. The base, A, is a metallic body shaped as shown in Figs. 1, 2, and 3, to fit over the back of the horse, and to have secured thereto the cushions or pads of the harness saddle, by means of the line turrets having their screw-threaded lower ends passed through the orifices $a$ and screwed into the nuts placed within the bodies of said pads or cushions, in the manner well known to the makers of harness. In the forward end of the top of this base is formed a rectangular recess $a'$ to have moving therein the free or downwardly acting arm of a spring yet to be described; to the rear of this recess, and upward through the top of the base, is formed an orifice $a^2$, countersunk below, through which a screw, to be hereinafter described, passes to secure the seat and base together; while to its rear edge is secured a yoke or buckle frame A' to be engaged by the back- or crupper-strap to keep the saddle from moving forward.

Figure 4:
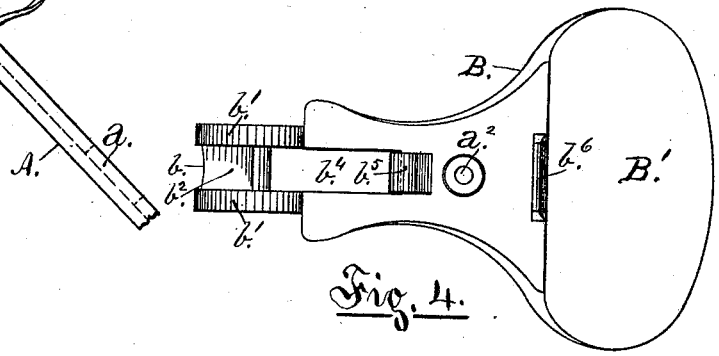
Figure 5:
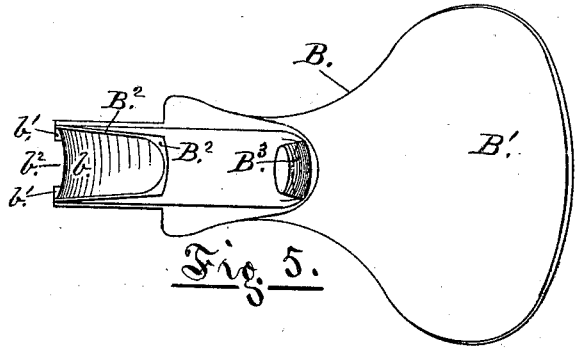

Fig. 5 shows a top, and Fig. 4, a bottom, view of the seat B which is an integral body, fitted to the top of the base A, (Figs. 1, 2, and 3.) and adapted to be secured thereto by a screw 1, passed through the orifice $a^2$ of the base and tapped into the seat, B, being best shown in Fig. 2. At the rear end is an upwardly and rearwardly sloping plate B' to cover the crupper buckle or yoke of the base, and at its forward end is an upwardly projecting and rearwardly curving arm or hook $B^2$ adapted to engage the loop or folded end of the check-rein when the horse is reined up, while to the rear of this hook is an upwardly projecting and forwardly curving arm or post $B^3$ to confine the check-rein rearward in place to prevent unreining.

In the forward edge of the hook, $B^2$, is formed a curved recess $b$ to receive, in part, the inner portion of the body of the retaining guard; at its lower end are two downwardly projecting ears or walls, $b'$ and $b'$, forming a recess $b^2$ to receive pivotally the lower end of said guard, and the walls are provided with orifices, $b^3$ and $b^3$, to receive and hold the pivot pin or screw; and, extending rearward from this recess is formed in the under face of said seat, a recess $b^4$ to house the holding spring, and having at its rear end a downwardly projecting and forwardly disposed hook-lug $b^5$ to hold the folded end of said spring in place; while, still further rearward, is a downwardly projecting lug or lip $b^6$ to engage the rear edge of the base, within the buckle loop, to keep said seat from moving forward.

Figure 6:
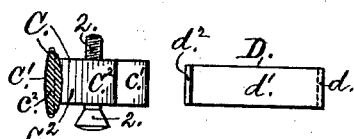

The retaining guard C consists of an upper or curved portion C' (Figs. 1 and 2) and a lower or pivot portion $C^2$ (Figs. 1, 2, and 6). The lower portion is fitted into the recess $b^2$ of the seat; an orifice $c$ extends transversely through its body to register with the orifices $b^3$, before mentioned, through which a pin or screw 2, best shown in Fig. 6, serves to pivot said guard to the seat; below the pivot point, is a rearwardly projecting arm or lip $c'$ on the upper face of which the forward end of an arm of a spring, yet to be described, serves to keep said lip pressed down; and, the portion $c'$, shown in cross section at $c^2$ in Fig. 6, curving upward and rearward, having the inner face of its body lying in the curved recess $b$ in the front edge of the rein hook, passes over the top of said hook and, curving downward, rearwardly sloping, extends over the top of the post, $B^3$, to a point toward the rear end of the seat where its extremity is finished in an ornamental scroll as $c^3$.

The holding spring D, appearing in side elevation in Fig. 2, and in top plan in Fig. 6, is formed of a flat strip of spring metal folded over into a V-shape, having a compressed loop $d$ at the fold, and two arms $d'$ and $d^2$ of practically equal lengths, having resiliency outward or apart; and, being placed within the recess $b^4$ of the seat, the loop $d$ under the lip of the hook $b^5$, the arm $d'$ against the body of the seat, and the free end of the arm $d^2$ on the lip $c'$ of the guard C, said spring is adapted to hold said guard in closed position (Fig. 2.)

An inspection of Figs. 1 and 2 of the drawings clearly shows the following points: that, the hook $B^2$ and the saddle being integrally made and having pivoting ears on the under side as shown, the check-rein holder possesses great strength; that, the seat being also provided with the upwardly projecting post $B^3$ and having the guard C pivoted thereto and the spring D to hold said guard in place, all as shown, the hook is a safety check-rein holder, having great convenience, both in reining up and unreining; that, the integral seat having the lip $b^6$ to engage the rear edge of the base and the walls $b^7$ to rest against its forward edge, and being secured to the top thereof by means of the countersunk screw 1, as shown, the saddle tree remains perfectly smooth underneath, having no projecting bolt and nut above the horse's back to make it sore; and that, should repairs be needed or broken parts replaced, the work can be conveniently done; because the saddle tree is exterior to its pads or cushions.

The invention having been described, what is considered new, and desired to be secured by Letters Patent, is—

An integral seat adapted to be secured to the top of the base of a harness saddle as shown, having an upwardly projecting hook at the forward end and an upwardly projected post rearward thereof; a guard arm having its lower end pivoted to the lower end of the hook and its shaft extended upward over the forward edge of the hook and over the top of said rearward post; and a spring, placed in a recess in the under face of the seat, having the forward end of its free arm to engage the top of the rearwardly projected lip of said guard arm, substantially as described and for the purpose set forth.

In testimony whereof I affix my signature in presence of two witnesses.

THOMAS J. HOUGHTON.

Witnesses:
PAUL A. HERR,
W. F. WOOD.